(No Model.)

T. J. PERRETT.
CHANGE SPEED MECHANISM.

No. 284,476. Patented Sept. 4, 1883.

Witnesses:
L. C. Hills
W. B. Masson

Inventor
Thomas J. Perrett
by E. E. Masson
atty.

UNITED STATES PATENT OFFICE.

THOMAS J. PERRETT, OF JAMESTOWN, NEW YORK.

CHANGE-SPEED MECHANISM.

SPECIFICATION forming part of Letters Patent No. 284,476, dated September 4, 1883.

Application filed August 2, 1883. (No model.)

*To all whom it may concern:*

Be it known that I, THOMAS J. PERRETT, a citizen of England, residing at Jamestown, in the county of Chautauqua and State of New York, have invented certain new and useful Improvements in Change-Speed Mechanism, of which the following is a specification, reference being had therein to the accompanying drawings, in which—

Figure 1:
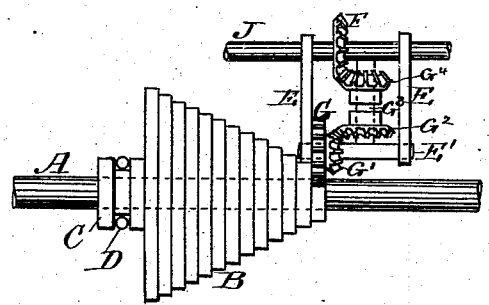
Figure 2:
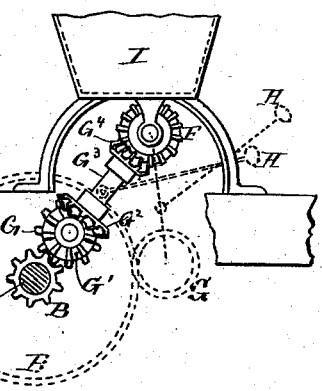
Figure 3:
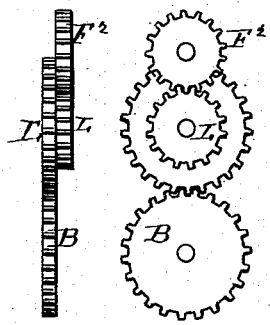

Figure 1 is a front view of the mechanism for changing speed. Fig. 2 is a side view of the same. Fig. 3 shows in front and side views a modified arrangement of the gears used for the same purpose.

My invention relates to change-speed mechanism in which a cone of gear-wheels is used in connection with a shifting-gear and devices to be operated thereby; and the objects of my improvements are to provide the driving-shafts with a cone of gear-wheels, and the driven shaft with not only a driven cog-wheel, but with a swinging frame mounted thereon, carrying gear-wheels and adapted to be retained at any angle.

The invention will first be described, and then specifically pointed out in the claims.

In the drawings, A represents the driving shaft or axle, carrying a series of gears, B, of different diameters, fastened together or made in one piece, to which is secured a circumferentially-grooved collar, C. This collar and the sliding gears B are moved upon the axle and controlled by a lever having its bifucated end D entering the groove in said collar.

E represents a swinging frame, having its upper end hinged upon the properly-supported driven shaft J. This frame carries a counter-shaft, E', parallel with the driving and driven shaft, and upon this counter-shaft are mounted a gear-wheel, G, to mesh with either one of the gear-wheels B, and a bevel-gear, G'. The latter meshes with a bevel-gear, $G^2$, secured upon the lower end of a shaft, $G^3$, carried at right angle to the shaft J by suitable means, as hereinafter stated. There is also secured upon the shaft $G^3$, adjoining its upper end, a bevel-gear, $G^4$, that meshes with the bevel-gear F, and thus transmits motion to the shaft J. The bearings for the diagonal shaft $G^3$ are secured either in sleeves passing around the shafts E' J at each end, or by bars running across the swinging frame, with bearings in said bars passing around the hub of the bevel-gears $G^2$ $G^4$.

I prefer to put the bearings around the hubs, in order to get them as close to the working-point as possible; but they may also be kept clear of the hubs and put around the shaft $G^3$, according to location.

In the present device I have shown the shaft J as supported by the hopper I of a grain-drill, and also represented the hand-lever H for throwing the cog-wheel G out of gear, while moving the series of gear B to the right or left. The shaft A is key-seated, and carries a key or spline, and in the eye of each gear B is a slot to receive said spline. The interior of the collar C may or may not be slotted.

When the device is applied to a seed-drill, the outer end of the lever D is carried up to the back of the hopper, and works on a segmental dial-plate in a manner similar to the lever H, and is pivoted at a point so located as to give to the cone-gears B the required throw. As the frame E swings around the axis of the shaft J, the transmitting-gears carried by said frame will work equally well in any direction.

In locations where the space between the two side pieces of the frame E has to be limited—as in a seven-inch grain-drill, for instance—I take out the bevel-gears and shaft $G^3$ and substitute the arrangement of plain gears shown in Fig. 3, in which B represents one of the wheels upon the axle, $F^2$ a gear on the driven shaft, and L an intermediate double gear meshing with the gear B and the gear $F^2$. When the distance between the shafts A and J is considerable, the bevel-gears, as shown in Figs. 1 and 2, should be used. When the space between the side pieces of the frame E will allow, I lift or swing said frame until G and B are out of gear, and move it to the right or left and put it in gear again by one operation, and in this case I do not use the collar C, lever D, &c., but have the series of gears B secured to the axle or shaft.

Having now fully described my invention, I claim—

1. In a change-speed mechanism, the combination of a series (or cone) of gears mounted upon the driving-shaft A, the driven shaft J, carrying a gear-wheel, a frame, E, hinged at one end to said driven shaft and capable of swinging thereon, with a train of gears mounted upon said frame, substantially as and for the purpose described.

2. In a change-speed mechanism, the combination of a series (or cone) of gears mounted upon the driving-shaft, the driven shaft carrying a gear-wheel, a frame hinged upon the driven shaft, a shaft journaled to said frame, and carrying gear-wheels, with intermediate gears, substantially as and for the purpose described.

In testimony whereof I affix my signature in presence of two witnesses.

THOMAS J. PERRETT.

Witnesses:
M. W. PARDEE,
N. D. LEWIS.